United States Patent [19]

Watts

[11] Patent Number: 5,664,334
[45] Date of Patent: Sep. 9, 1997

[54] INCLINATION ANGLE RULER

[76] Inventor: Eric Watts, 3729 Vista St., Long Beach, Calif. 90803

[21] Appl. No.: 678,396

[22] Filed: Jul. 2, 1996

[51] Int. Cl.$^6$ .............................. G01B 5/00; B43L 7/00
[52] U.S. Cl. ........................... 33/1 N; 33/494; 235/69
[58] Field of Search ........................... 33/1 C, 1 G, 1 N, 33/1 SB, 485, 486, 494; 434/141, 146, 153; 235/61 GM, 61 NY, 61 PS, 69

[56] References Cited

U.S. PATENT DOCUMENTS

| 190,447 | 5/1877 | Putnum | 33/494 |
|---|---|---|---|
| 846,241 | 3/1907 | Overland | 33/499 |
| 1,976,861 | 10/1934 | Tombal | 33/494 |
| 2,140,914 | 12/1938 | Kothny | 33/494 |
| 3,325,901 | 6/1967 | Bruscaglioni | 33/494 |
| 4,097,998 | 7/1978 | Klimavicz et al. | 33/1 SB |
| 4,117,313 | 9/1978 | Vincent | 235/61 GM |
| 4,217,696 | 8/1980 | Schindler | 33/1 SB |
| 4,271,596 | 6/1981 | Ganis | 33/1 C |

FOREIGN PATENT DOCUMENTS

| 273116 | 1/1951 | Switzerland | 33/494 |
|---|---|---|---|
| 16890 | 7/1902 | United Kingdom | 33/494 |
| 2216265 | 4/1989 | United Kingdom | 33/494 |

Primary Examiner—G. Bradley Bennett

[57] ABSTRACT

This invention pertains to a new type of ruler for measuring the angle of inclination of a portion of terrain from a topographical map. Topographical maps contain precise information relating to elevation changes and distances. These two pieces of information can be used together to devise a scale to measure the angle of inclination, or pitch, of any slope represented on the map. The invention is simply the inscription of such a scale on a straight, flat material. The invention can be made with a unique scale for any given map scale and contour interval height.

1 Claim, 1 Drawing Sheet

INCLINATION ANGLE RULER

BACKGROUND

1. Field of the Invention

This invention relates to simple measurement devices, or rulers, specifically to a new device for topographical map reading.

2. Description of Prior Art

Topographical maps have been used for many years to provide the map reader both distances between two locations (proportional to the map scale) and elevation changes between different locations (proportional to the contour interval). This information can be quantified by measuring distance and counting contour intervals between the two points of interest, respectively. Determining the steepness of the terrain has typically been accomplished qualitatively. If the contour intervals appear close together, the terrain is steep; if the intervals are far apart, the terrain is relatively flat. No record has been found of a device that quantitatively measures the angle of inclination, or pitch, represented on topographical maps.

With the increased use of the backcountry for recreational purposes, more information is required from existing topographical maps. Cross-country skiers and hikers can both benefit from knowing how steep is the terrain. The invention described in this application solves this deficiency by providing topographical map readers of all recreational persuasions a simple, easy-to-use ruler for measuring terrain pitch.

OBJECTIVES AND ADVANTAGES

Accordingly, several objects and advantages of my invention are as follows. First and foremost, the invention provides a quantitative measurement of the pitch of any portion of a topographical map. Moreover, the invention can be produced for maps of any scale and contour interval height.

Further objects and advantages of my invention will become apparent from a consideration of the ensuing description.

DESCRIPTION OF DRAWINGS

The simplicity of my invention allows sufficient detail of description by presenting a plan view drawing only. The thickness of the invention can be varied and does not affect function.

SUMMARY

Figure 1:
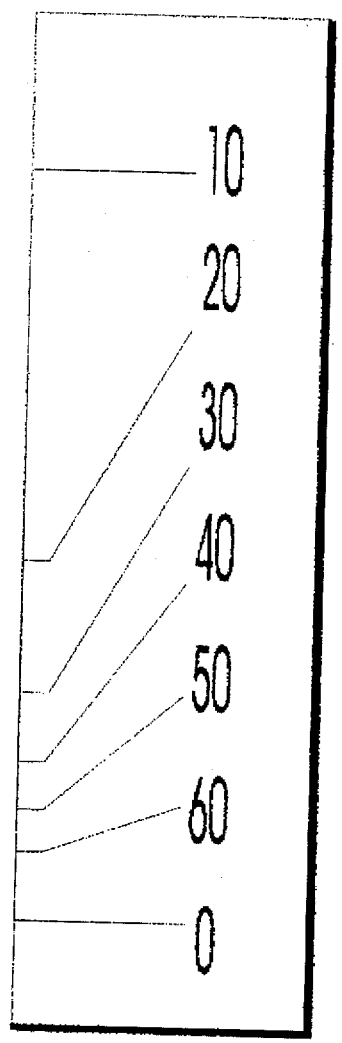
FIG. 1 is a plan view of the invention for a specific map scale, contour interval height, angular measurement range, and measurement resolution. The FIGURE shows marks for alignment with map features and numbers denoting the pitch of the slope in degrees. The invention will possess the same basic physical properties irrespective of the map scale, interval height, angular measurement range, and measurement resolution.

In summary, this invention allows the topographical map reader to determine the pitch, or angle of inclination, of any portion of any topographical map by a simple ruler measurement.

DESCRIPTION OF THE INVENTION

FIG. 1 shows a plan view of the invention (ruler). The invention is physically similar to other rulers, being composed of a flat, straight material upon which markings are made. FIG. 1 shows marks for alignment with map features and numbers denoting the pitch of the slope in degrees. The marks are typically unevenly spaced to provide constant degree increments, however, marks can be adjusted to any spacing as desired. The thickness of the ruler does not affect its purpose and can be varied to any desired dimension. The material of which the invention is made can be any material that is stiff enough to hold its shape without elongating or contracting, as this would affect the accuracy of the measurement.

THEORY OF OPERATION

The theory of the invention is based on the simple trigonometry which relates distance and elevation in the field, and also as represented on a map. Distance and elevation can be thought of as defining a right triangle in the vertical plane as shown in Example 1.

Example 1.
Theory is based on a triangle in the vertical plane, the pitch is denoted $\Theta$.

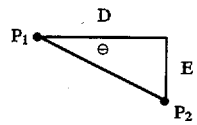

Remember that distances on maps are projected distances. In the FIGURE, D is the (projected) distance between the two points $P_1$ and $P_2$, E is the elevation difference between the points, and $\theta$ is the pitch of the slope between the two points.

The distance and elevation change between two field points are related to the map scale and contour interval height, respectively. The elevation change between the points is proportional to the number of contour intervals, N, crossed in traversing the map between the two points. If the contour interval represents "h" feet, then the elevation change is, $$E = h \times N$$

Similarly, the actual projected distance between points is determined from the map scale, "s" and the distance traversed on the map between the two points, "d", by, $$D = s \times d$$

The pitch or angle of inclination, $\theta$, can then be calculated from the above quantities as, $$\theta = \tan^{-1}[(h \times N)/(s \times d)]. \qquad \text{eqn. (1)}$$

For a given map, the scale, s, and contour interval, h, are constants. By measuring across a certain number of contour intervals, N, equation (1) provides a direct relationship between the distance on the map, d, and the pitch, $\theta$. The invention is based on this relationship.

OPERATION OF INVENTION

The origin, or mark denoted by "0" in FIG. 1, is used as the starting point of the measurement. The origin is aligned with one of the contour lines of the map, with the ruler's edge pointed in the direction of which the pitch measurement is desired. A measurement is made across a predetermined number of contour interval lines, N, as discussed above in "Theory of Operation". The pitch is read off from the numerical values on the ruler, where the $N^{th}$ contour interval line intersects the ruler. If the $N^{th}$ contour interval line lies between two marks on the ruler, an estimate must be made, as with any ruler. The measurement, made as described above, represents the average pitch over the N contour intervals.

CONCLUSION, RAMIFICATIONS, AND SCOPE OF INVENTION

Thus the reader can see that the invention provides a simple and effective tool for determining the pitch of any desired slope from a topographical map.

Although the description above contains certain specifics, these should not be taken as limitations to the scope of the invention, but only as illustrations of the presently preferred embodiment of the invention. For example, the invention could be made into various shapes such as a square, a triangle, etc.. These additional sides could be used for including different scales on the same ruler.

Thus the scope of the invention should be determined not by the specific descriptions above but by the appended claims and there legal equivalent.

I claim:

1. A measurement tool for use with a topographical map having contour intervals, said tool comprising:

a piece of material upon which definite lengths are defined by a set of marks including indicia indicative of an inclination angle, wherein the inclination of a slope may be determined by aligning the marks of the tool with the contour intervals of a topographical map.

* * * * *